United States Patent
Alfekri et al.

(10) Patent No.: US 10,696,013 B2
(45) Date of Patent: Jun. 30, 2020

(54) DAY-AND-NIGHT BACKLIT FILM

(71) Applicant: Hewlett-Packard Development Company, L.P., Houston, TX (US)

(72) Inventors: Dheya M. Alfekri, San Diego, CA (US); Ronald J. Selensky, Poway, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 139 days.

(21) Appl. No.: 15/772,072

(22) PCT Filed: Dec. 21, 2015

(86) PCT No.: PCT/US2015/067160
§ 371 (c)(1),
(2) Date: Apr. 29, 2018

(87) PCT Pub. No.: WO2017/111911
PCT Pub. Date: Jun. 29, 2017

(65) Prior Publication Data
US 2018/0311932 A1    Nov. 1, 2018

(51) Int. Cl.
*B32B 7/02* (2019.01)
*C08J 5/18* (2006.01)
*G02B 5/02* (2006.01)

(52) U.S. Cl.
CPC .................... *B32B 7/02* (2013.01); *C08J 5/18* (2013.01); *G02B 5/0236* (2013.01); *G02B 5/0289* (2013.01); *G02B 5/0294* (2013.01); *B32B 2307/412* (2013.01)

(58) Field of Classification Search
CPC ........ B32B 2307/412; B32B 7/02; C08J 5/18; G02B 5/0236; G02B 5/0289; G02B 5/0294
See application file for complete search history.

(56) References Cited

U.S. PATENT DOCUMENTS

| | | | |
|---|---|---|---|
| 6,111,622 A | 8/2000 | Abileah | |
| 6,898,012 B2 | 5/2005 | Kaminsky et al. | |
| 7,048,400 B2 * | 5/2006 | Murasko | G09F 13/22 313/506 |
| 7,419,272 B2 | 9/2008 | Schenke et al. | |
| 7,942,542 B1 | 5/2011 | Dunn | |
| 2004/0177540 A1 | 9/2004 | Abron | |
| 2008/0020210 A1 | 1/2008 | Griffin et al. | |
| 2008/0311349 A1 | 12/2008 | Johnson et al. | |
| 2009/0097229 A1 | 4/2009 | Wood et al. | |

FOREIGN PATENT DOCUMENTS

| | | |
|---|---|---|
| WO | WO-95/08818 | 3/1995 |
| WO | WO-2010-022317 | 2/2010 |

OTHER PUBLICATIONS

"Making Backlit Signs with 3M Digitally-Printed Graphics", Instruction Bulletin 4.26, Release D, Feb. 2002, p. 1-14, 3M Commercial Graphics Division, St. Paul, MN.
International Search Report and Written Opinion for International Application No. PCT/US2015/067160 dated Aug. 24, 2016, 7 pages.

* cited by examiner

*Primary Examiner* — Lawrence D Ferguson
(74) *Attorney, Agent, or Firm* — Dierker & Kavanaugh PC

(57) ABSTRACT

A day-and-night backlit film may include: a film having a front side and a back side; a translucent inkjet receiving coating layer applied to the front side of the film; and a reflective layer applied to the back side of the film. A method of manufacturing the backlit film is also described.

11 Claims, 3 Drawing Sheets

DAY-AND-NIGHT BACKLIT FILM

BACKGROUND

The popularity of large format inkjet printing is rapidly increasing. The applications range from wall coverings to signs, advertising, banners, commercial applications, and the like, with the printing incorporating, symbols, photographs, architectural drawings, graphics and/or text. Certain inkjet large format applications such as illuminated signboard use a polymeric film as the supporting base and on which one side is applied an ink receiving layer as the carrier of the image.

The film media can be used as regular "front-side" viewing, where light illuminates on the media from the front and reflects back to viewer's eyes. Other film media can be used as "back-side" viewing where light such as in a light box comes from behind the image through a light diffusion panel or light diffusion coating layer and illuminates the printed image.

BRIEF DESCRIPTION OF THE DRAWINGS

Features of examples of the present disclosure will become apparent with reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Reference is made now in detail to specific examples, which illustrate the best mode presently contemplated by the inventors for practicing examples of the present disclosure. Alternative examples are also briefly described as applicable.

Currently, day-and-night backlit film is complicated to make. The media is designed to be made with a polyester film with inkjet coating on both sides (double side coated media). It can also be made by laminating two conventional backlit films back to back. Further, there may be a requirement of a diffuser layer in between the two image sides to prevent color dissipation during day exposure. The current day-and-night film technology has a front side with a normal printed image. The backside of the media has the same image or the same image with subtle differences printed in reverse orientation to match registration with the same front side image. The backside image acts as a reflecting background with a middle layer of diffuser coating. Customers have to use special latex printers or other printers that are capable of registering images in the two sided printing. Even with very expensive printer systems, the registration may sometimes be off due to operator error or to printer calibration errors. In addition, due to the cost of these printers, few print shops have access to them. It may be a major new investment for many print shops.

Figure 1A:
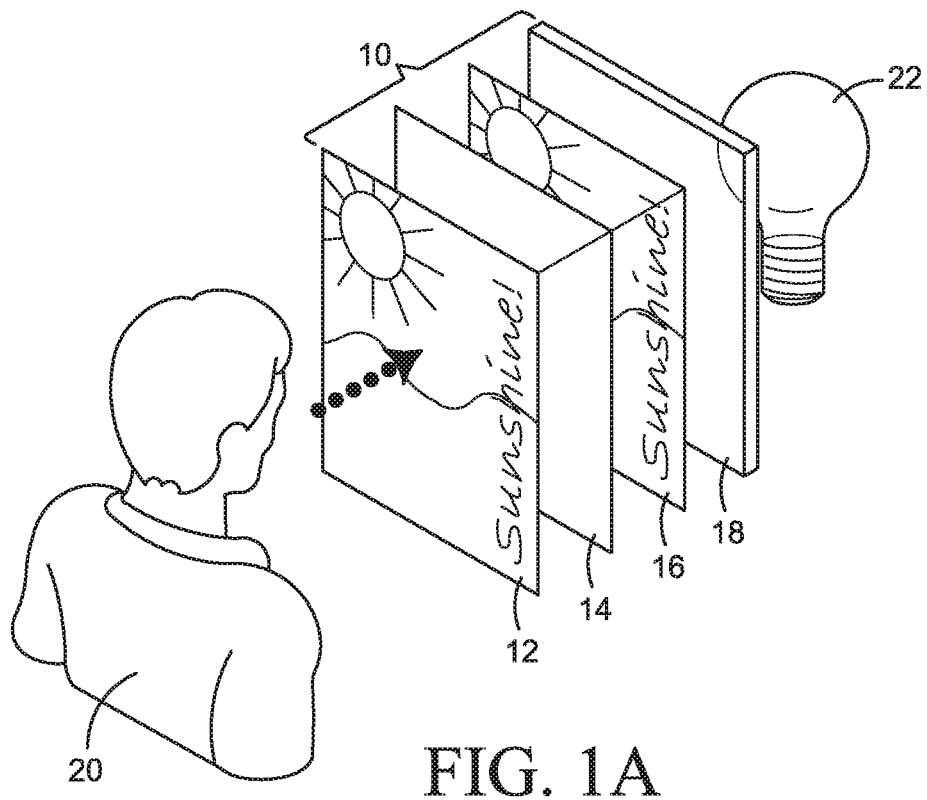
FIGS. 1A-1B each illustrate a system for day-and-night backlit films, according to examples.

The day-and-night backlit films described above are usually made using one of two complicated approaches. The first approach, depicted in FIG. 1A, is either a three- or four-layer system 10, composed of one print layer 12, followed by white ink layer 14, followed by another print layer 16, with a fourth layer as a transparent layer 18. A viewer 20 is positioned in front of the system 10, and a light 22 illuminates the system 10 from the backside.

Figure 1B:
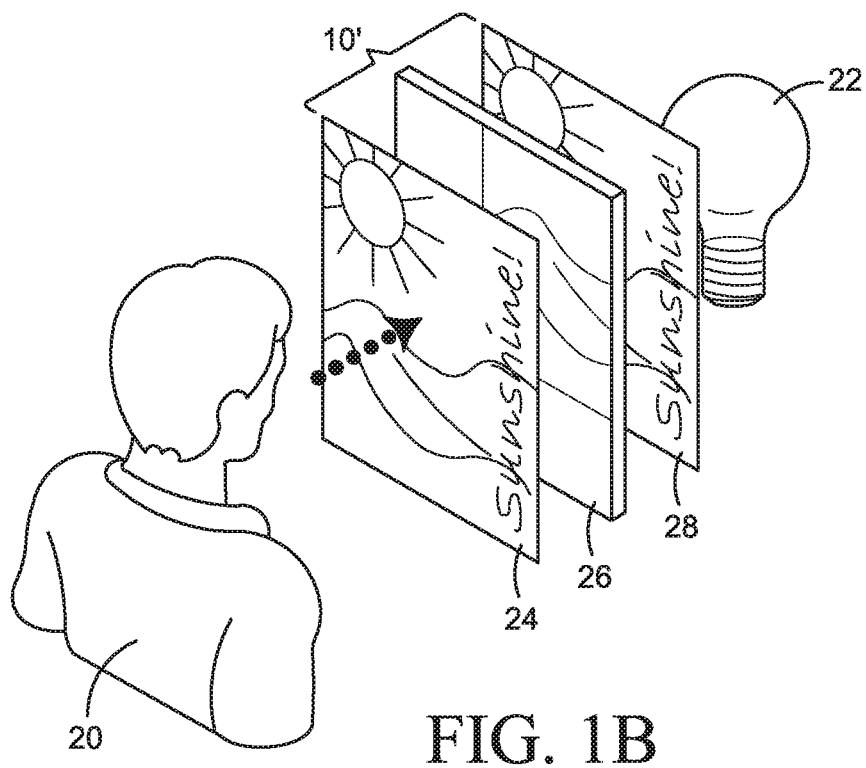

The second approach, depicted in FIG. 1B, is to provide a system 10', composed of a translucent middle layer 24 and two inkjet coating layers 26, 28 on each of the two sides of the translucent layer 24.

These two approaches are currently used and are becoming more popular. But they are very expensive, hard to reproduce and hard to print correctly. The white ink layer 14 in system 10 is very expensive and limits the type of printer available that can be used to print the media.

In accordance with the disclosure herein, day-and-night backlit films can be made in a simple and low cost approach by using a reflective backlit film. The image depicts vivid color during day due to a mirror surface effect and at night using a regular light box. With this new approach, the media may be printed on one side and ready to be used for day-and-night applications.

Figure 2A:
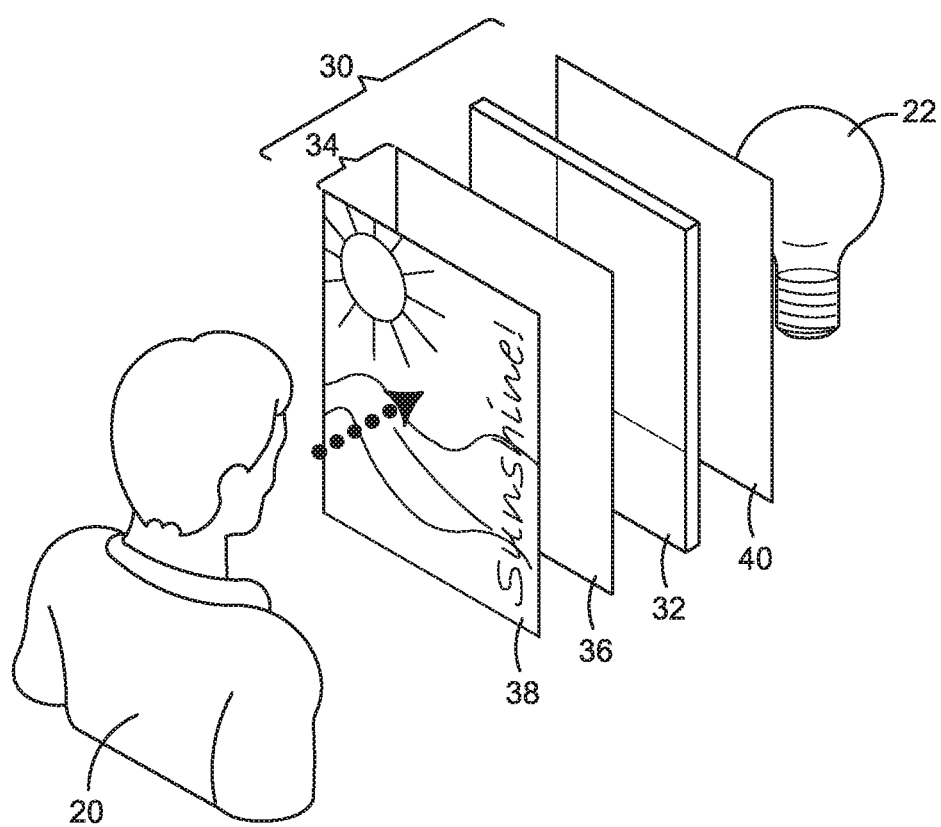
FIG. 2A illustrates a system for a single side day-and-night backlit film, according to an example.
Figure 2B:
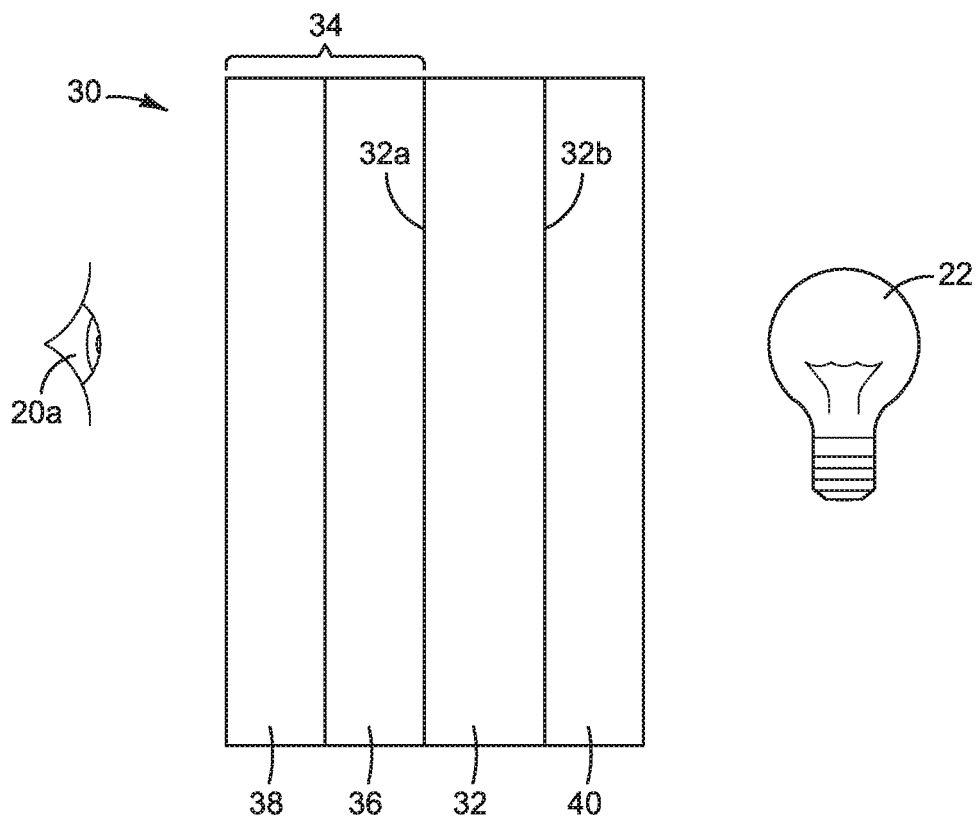
FIG. 2B is an enlargement of FIG. 2A, showing the details of the backlit film.

FIG. 2A depicts a backlit film 30, while FIG. 2B depicts an enlargement of the backlit film. The backlit film includes the film 32 having a front side 32a and a back side 32b. The viewer 20 in FIG. 2A is depicted by eye 20a in FIG. 2B.

On the front side 32a of the film 32 may be the translucent inkjet receiving layer 34. The translucent inkjet receiving layer 34 may include two layers, an opacifying layer 36 and an inkjet ink receiving layer 38. The opacifying layer 36 may be formed on top of the front surface 32a of the transparent film 32. The opacifying layer 36 gives the film the translucent appearance just like a light diffuser panel to dissipate and diffuse the light evenly, in addition to improving the color light reflection to the viewer. The inkjet ink receiving layer 38 may be formed on the opacifying layer 36. Generally, the term "ink receiving layer" refers to one or more layers that receive at least a portion of ink materials being delivered to the media in a printing process.

In its broadest configuration, the day-and-night backlit film 30 may include:
 the transparent film 32 having a front side 32a and a back side 32b;
 the translucent inkjet receiving coating layer 34 applied to the front side 32a of the film 32; and
 the reflective layer 40 applied to the back side 32b of the film 32.

The transparent film may be clear, colored, or dyed. As employed herein, the term "transparent" may refer to a film having 100% light (optical) transmission. However, it may be appreciated that the transparency of a film may be reduced due to the use of colored or dyed film or and/or to the use of additional layers formed thereon. Examples of resulting transparencies may include 5%, 20%, 25%, 30%, and 50%, as well as any range within and in between these numbers.

As employed herein, the term "translucent" may refer to a layer having an opacity of 70% and a transparency of 30%. Examples of other translucent layers may include 95%-5%, 80%-20%, 75%-25%, 70%-30%, and 50%-50% opaque-transparent.

The film 32 may be a polyester film, such as polyethylene terephthalate (PET). Other transparent, or optically clear, films that have the requisite rigidity for backlit films may also be employed. Examples include polyethylene, polypropylene, polycarbonate, polyacrylate, polystyrene, nylon, and polyvinylacetate. The film 32 may have a thickness within a range of from about 1 mil to about 10 mils. In some examples, the thickness may be within a range of about 5 mils to about 7 mils.

As will be seen below, the opacifying layer 36 and the inkjet ink receiving layer 38 may include many of the same components. Accordingly, it may be appreciated that the opacifying layer 36 and the inkjet ink receiving layer 38 may be represented as a single layer 34. In this case, the translucent inkjet receiving layer 34 may be a single layer containing both opacifying agents and inorganic particulate pigments in a coating matrix suitable for receiving an ink. If layer 34 is present as a single layer, then more pigment may need to be added than listed for either layer to give sufficient opacity. For example, from about 5 weight percent (wt %) to about 30 wt % total using $TiO_2$ pigment may be added. The opacity may range from about 50% to about 75%, depending on the coating formulations. With a latex ink, an opacity of 50% and 75% may be sufficient, while with a non-latex ink, 75% opacity may be better.

The opacifying layer 36 may be composed of opacifying agents such as metal oxides and/or semi-metal oxides particles that may be independently selected from silica, alumina, boehmite, silicates (such as aluminum silicate, magnesium silicate, and the like), titania, zirconia, calcium carbonate, calcium oxide, zinc oxide, clays, or combinations thereof. In some examples, the inorganic pigments particles are modified or unmodified fumed silica. If silica is used, it can be selected from commercially available fumed silica: Cab-O-Sil® LM-150, Cab-O-Sil® M-5, Cab-O-Sil® MS-55, Cab-O-Sil® MS-75D, Cab-O-Sil® H-5, Cab-O-Sil® HS-5, Cab-O-Sil® H-5, Aerosil® 150, Aerosil® 200, Aerosil® 300, Aerosil® 350, and/or Aerosil® 400. In some other examples, the inorganic particulate pigments may be modified or unmodified alumina. The alumina coating may include pseudo-boehmite. Commercially available alumina particles can be used, including, but not limited to, Sasol Disperal® HP10, Disperal® HP14, boehmite, Cabot Cab-O-Sperse® PG003 and/or CabotSpectrAl® 81 fumed alumina. Additional examples of suitable opacifying agents may include halospheres, such as alumina hybridized halospheres, made of adipic acid/neopentylglycol crosspolymer (and) water (and) acrylates/ethylhexyl acrylates copolymer (and) alumina (and) silica (available from, e.g., KODA Corp.), plastic pigments, polymeric pigments, such as acrylic polymers, and mixtures thereof, either within this list or with the metal oxides and semi-metal oxides listed above.

The opacifying layer 36 may have a coat thickness within a range of about 5 grams/$m^2$ (gsm) to about 50 gsm. In an example, the coat thickness of the opacifying layer 36 may be about 25 gsm. The opacifying layer 36 may be applied to film 32 first, then followed by the inkjet ink receiving layer 38, since layer 36 may serve to adhere both to the film 32 and to the inkjet ink receiving layer 38.

During application, the opacifying layer 36 can be coated onto the surface 32a of the film 32 by any number of material dispensing machines and/or methods including, but not limited to, a slot coater, a curtain coater, a cascade coater, a blade coater, a rod coater, a gravure coater, a Mylar rod coater, a wired coater, a knife coater, a microgravure coater, and the like.

The inkjet ink receiving layer 38 may be a porous layer formed, e.g., on the surface of the opacifying layer 36. The inkjet ink receiving layer 38 absorbs an ink that is deposited or printed onto the day-and-night backlit film 30. More specifically, the ink is deposited or printed onto the inkjet ink receiving layer 38, and the ink vehicle is absorbed therein. Alternatively, the vehicle may be dried out during ink printing and curing with latex ink and some solvent-based inks.

The inkjet ink receiving layer 38 may include at least one pigment and a binder. The inkjet ink receiving layer 38 may also include one or more additives. The pigment for the inkjet ink receiving layer 38 may be chosen from pigments having a micro-porous structure and/or which may form a micro-porous structure as a result of aggregation of multiple particles. Some examples of pigments include silica (such as, e.g., fumed silica, colloidal silica, silica gels, and/or treated silicas), alumina, and zirconia. In an example, the pigment is chosen from silica, and the aggregate size of the silica particles ranges from about 20 nm to about 600 nm. In another example, the aggregate size of the silica particles ranges from about 100 nm to about 500 nm. In further examples, the Brunauer-Emmett-Teller (BET) surface area of the silica (such as fumed silica) ranges from about 100 $m^2/g$ to about 350 $m^2/g$; or from about 180 $m^2/g$ to about 300 $m^2/g$. The silica powders are pre-dispersed and accordingly, the zeta potential measurement used to measure the stability of the dispersion at a pH of from about 4 to about 5 is around +30 mV or higher.

Other examples of pigments that may be used for the inkjet ink receiving layer 38 include carbonates (e.g., calcium carbonates such as precipitated calcium carbonate, ground calcium carbonate, and treated calcium carbonate), clays (e.g., kaolin clays, calcined clays, engineered clays, and treated clays), talc, titanium dioxide, zeolites, calcium sulfate, aluminas, silicates, aluminum trihydrate (ATH), and combinations thereof. In an example, the pigment(s) is/are present in the inkjet ink receiving layer 38 in an amount ranging from about 50 wt % to about 95 wt % of the ink receiving layer.

The binder for the inkjet ink receiving layer 38 may be used in the layer 38 to hold the pigment particles together, as well as to adhere the pigment particles to the underlying opacifying layer 36. Some examples of the binder include natural and synthetic water-soluble binders and natural and synthetic water-dispersible binders. Some examples of binders include natural and chemically modified starches, gelatin, celluloses, acrylamide polymers, acrylic polymers, acrylic copolymers, vinyl acetate latex, vinyl acetate polymers and derivatives thereof (e.g., polyvinyl alcohol), polyesters, vinylidene chloride latex, styrene-butadiene copolymer latex, styrene/n-butyl acrylate copolymer, and/or acrylonitrile-butadiene copolymer latex. In an example, the amount of binder present ranges from about 3 wt % to about 40 wt % of the ink receiving layer 38.

Examples of additives that may be used in the inkjet ink receiving layer 38 include surfactants, humectants, cross-linking agents, and/or other processing aids such as pH buffers and defoamers. Examples of surfactant(s) include surfactant 10G (p-isononylphenoxy-polyglycidol) available from Arch Chemicals, Inc. (Norwalk, Conn.) and PLURONIC® L62 available from BASF Corp. (Ludwigshafen, Germany). Examples of humectants include glycerol, diethylene glycol mono butyl ether, and/or combinations thereof. The cross-linking agent may be used to cross-link the binders present in the inkjet ink receiving layer 38, and an example of the cross-linking agent includes boric acid.

In an example, the inkjet ink receiving layer 38 is a porous layer (e.g., the layer 38 includes pores having an effective pore diameter ranging from, e.g., the submicrometer range to about 500 nm), and as a porous layer, the ink receiving layer 38 can absorb ink vehicles of pigment-based or dye-based inks. In another example, the inkjet ink receiving layer 38 is a water-swellable layer, and as a swellable layer, the inkjet ink receiving layer 38 can receive a dye-based ink or a pigment-based ink. In either case, the inkjet ink receiving layer 38 may have any suitable thickness. In an example, the inkjet ink receiving layer 38 thickness may range from about 5 µm to about 50 µm.

During application, the inkjet ink receiving layer 38 can be coated onto the opacifying layer 36 by any number of material dispensing machines and/or methods including, but in no way limited to, a slot coater, a curtain coater, a cascade coater, a blade coater, a rod coater, a gravure coater, a Mylar rod coater, a wired coater, knife coater, a microgravure coater, and the like.

On the backside 32b of the film 32 may be the reflective layer 40. The reflective layer 40 may be a material chosen from aluminum (Al), copper (Cu), indium (In), silver (Ag), platinum (Pt), palladium (Pd), rhodium (Rh), indium tin oxide (ITO), and gold (Au) and alloys thereof. The thickness of the metal layer 40 can affect transmission. The thickness of the metal layer 40 may be thick enough to reflect light from the front side, but thin enough to pass light from the light source 22. As an example, the minimum transmission may be at least 25%. Consistent with the foregoing, the reflective layer 40 may have a thickness within a range of from about 5 Angstroms to about 3,000 Angstroms, or about 1,000 Angstroms to about 3,000 Angstroms, or about 50 Angstroms to about 100 Angstroms.

While the order of deposition of the reflective layer 40 and the translucent inkjet receiving layer may be immaterial, in some examples, the reflective layer 40 may be deposited before deposition of the translucent inkjet receiving layer.

The formation of the layers 34 and 40 on the film 32 may be done on a mill roll of film 32, in a continuous process to form a mill roll of coated film 30. After completing the formation of the mill roll of coated film 30, sheets from the coated film 30 may be cut into smaller media sheets, e.g., 8.5 by 11-inch media sheets, etc., as is known in the art.

In an example, the day-and-night backlit film 30 may include:
  the polyester film 32;
  the translucent inkjet receiving coating layer 34 applied to the front side 32a of the film 32, the translucent inkjet receiving coating layer 34 including the opacifying layer 36 and the inkjet ink receiving layer 38; and
  the reflective layer 40 applied to the back side 32b of the film 32, wherein the reflective layer 40 is a metal chosen from, e.g., aluminum, copper, silver, and gold.

In another example, the day-and-night backlit film 30 may include:
  the polyester film 32;
  the translucent inkjet receiving coating layer 34 applied to the front side 32a of the film 32, the translucent inkjet receiving coating layer 34 being a single layer that combines the opacifying layer 36 and the inkjet ink receiving layer 38 as one; and
  the reflective layer 40 applied to the back side of the film, wherein the reflective layer 40 is a metal chosen from, e.g., aluminum, copper, silver, and gold.

Figure 3:
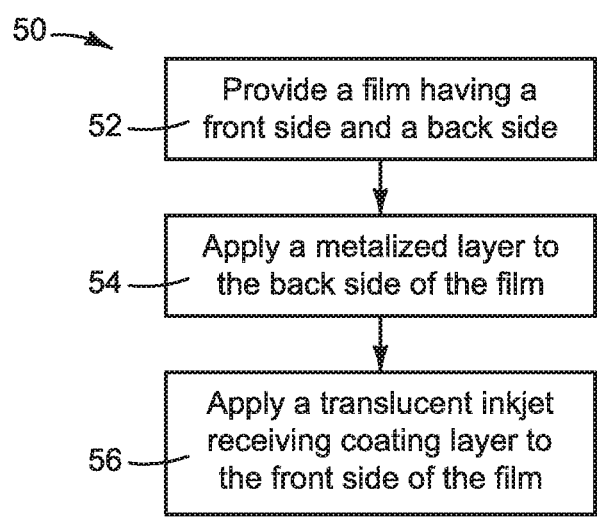
FIG. 3 is a flow chart, showing an example method for manufacturing the single side day-and-night backlit film.

Referring now to FIG. 3, an example method 50 of manufacturing a day-and-night backlit film 30 may be provided. The method 50 may include:
  providing 52 the film 32 having front side 32a and back side 32b;
  applying 54 the reflective layer 40 to the back side 32b of the film 32; and
  applying 56 the translucent inkjet receiving coating layer 34 to the front side 32a of the film 32.

In the method 50 as described above, the method 54 of applying the reflective layer may be performed by any of vacuum metallization, arc and flame spraying, electroless deposition, electroplating, and metallic and alloy coating, vacuum metallization, arc and flame spraying, electroplating, or metallic and alloy coating. An example of vacuum metallization may include sputtering. So, for example, the reflective layer 40 may be sputtered on the backside 32b of the film 32 to provide the reflective layer 40 with a mirror effect. The reflective layer 40 is thick enough to provide the mirror effect for daytime viewing, yet thin enough to allow light 22 to pass through the reflective layer 40 for nighttime viewing, as discussed above.

In the method 50 as described above, the method 56 of applying the translucent inkjet receiving coating layer 34 to the front side 32a of the film 32 may include:
  applying the opacifying layer 36 to the film 32; and
  applying the inkjet ink receiving layer 38 to the opacifying layer 36.

The methods of applying the layers 36 and 38 (or layer 34, if used alone) may use any of the methods of coating described above.

The day-and-night backlit film 30 disclosed herein may be used with latex inkjet ink compositions. By latex inkjet ink composition or latex-based ink composition is meant herein an ink composition containing polymeric latex. By inkjet composition, it is meant herein that the composition is well adapted to be used in an inkjet device and/or in an inkjet printing process.

The day-and-night backlit film 30 may also be used with aqueous inkjet inks, UV inkjet inks, eco solvent inkjet inks, and electrostatic inkjet ink toner.

The inks commonly used with the coated film 30 may have a colorant and a vehicle, with suitable additives such as surfactants, humectants, biocides, and the like to control the properties of the ink. Further additives may include, without limitation, buffers, viscosity modifiers, sequestering agents, and stabilizing agents. The inks can also carry other solids, such as polymers, UV curable materials, plasticizers, salts, etc.

If latex inks are employed, the polymeric latex refers herein to a group of preparations consisting of stable dispersion of polymeric micro-particles dispersed in the aqueous vehicle of the ink. In an example, the polymeric latex may be a natural latex or a synthetic latex. Synthetic latexes are usually produced by emulsion polymerization using a variety of initiators, surfactants and monomers. There is no specific limitation on chemical composition of latex. Furthermore, there is no limitation of the surface charge of the polymeric latex. In an example, the polymeric latex may be a cationic, anionic, or amphoteric polymeric latex. In another example, the polymeric latex may be chosen from acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers.

In an example of the present disclosure, the ink composition referred herein includes one or more colorants that impart the desired color to the printed message. As used herein, "colorant" includes dyes, pigments, and/or other particulates that may be suspended or dissolved in an ink vehicle. The colorant may be present in the ink composition in an amount required to produce the desired contrast and readability. In an example, the inks may include pigments as colorants. Pigments that can be used include self-dispersed pigments and non-self-dispersed pigments. In an example, suitable pigments may be black pigments, white pigments, cyan pigments, magenta pigments, yellow pigments, or the like. Pigments, according to an example of the present disclosure, may be organic or inorganic particles as well known in the art.

As used herein, "liquid vehicle" is defined to include any liquid composition that is used to carry colorants, including dyes or pigments, to a substrate, such as translucent inkjet receiving coating layer 34. Liquid vehicles are well known in the art, and a wide variety of liquid vehicle components may be used. Aqueous-based inks may include water and/or water-soluble organic solvents. The liquid vehicle may include a combination of one or more solvents and co-solvents.

During the daytime, the image may appear to exhibit very bright and vivid colors as the reflective mirror layer 40 in the back reflects the incident light (sun light) back to the viewer 20 that observes the vivid image color. That is to say, the printed image can be seen easily during daylight since the metalized layer 40 (thin in Angstroms scale) on the backside 32b reflects the light so that the viewer 20 observes a bright vivid color image. During nighttime, the film may act as a conventional backlit film using the light from the backlit light box 22. That is to say, when it is nighttime, the light source 22 in the light box penetrates the reflective layer 40 and the film 32 in a conventional way that the backlit film is used and the image appears as backlit, also with a bright image appearance.

The disclosure herein may provide several advantages, including easy to make and low cost. There is no need for special printers with image registration capability and no need for extra time to calibrate. Finally, the versatility of the reflective layer 40 can be designed to be an effective polarizing layer to the light 22 as well. The incident and reflective light angles that can give the viewer different views of the image depending on the viewer angle can be determined. This polarizing property may have some special applications which may not be possible to do with the conventional multi layers day-and-night films or even the conventional backlit films.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 100 nm to about 500 nm should be interpreted to include not only the explicitly recited limits of about 100 nm to about 500 nm, but also to include individual values, such as 175 nm, 224.5 nm, etc., and sub-ranges, such as from about 165 nm to about 330 nm, etc. Furthermore, when "about" is utilized to describe a value, this is meant to encompass minor variations (up to ±10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting. Further, a process order may be altered. For example, the translucent inkjet receiving coating layer 34 may be applied prior to application of the reflective layer 40.

What is claimed is:

1. A day-and-night backlit film, comprising:
   a transparent film having a front side and a back side;
   a translucent inkjet receiving coating layer applied to the front side of the transparent film, the translucent inkjet receiving layer being a dual layer including:
      an opacifying layer on the transparent film, the opacifying layer containing opacifying agents selected from the group consisting of silicon dioxide, titanium dioxide, zinc oxide, calcium oxide, calcium carbonate, halospheres, plastic pigments, polymeric pigments, clays, aluminum oxide, and mixtures thereof; and
      an inkjet ink receiving layer on the opacifying layer; and
   a reflecting layer applied to the back side of the transparent film.

2. The backlit film as defined in claim 1 wherein the transparent film comprises a material selected from the group consisting of polyethylene terephthalate (PET), polyethylene, polypropylene, polycarbonate, polyacrylate, polystyrene, nylon, and polyvinylacetate.

3. The backlit film as defined in claim 1 wherein the translucent inkjet receiving coating layer is for receiving a latex ink, an aqueous inkjet ink, a UV inkjet ink, an eco solvent inkjet ink, or an electrostatic inkjet ink toner.

4. The backlit film as defined in claim 1 wherein the reflecting layer comprises a material selected from the group consisting of aluminum (Al), copper (Cu), indium (In), silver (Ag), platinum (Pt), palladium (Pd), rhodium (Rh), indium tin oxide (ITO), and gold (Au).

5. The backlit film as defined in claim 1 wherein the reflecting layer has a thickness within a range of about 5 Angstroms to about 3,000 Angstroms.

6. A method of manufacturing a day-and-night backlit film, the method including:
   providing a transparent film having a front side and a back side;
   applying a reflecting layer applied to the back side of the transparent film; and
   applying a translucent inkjet receiving coating layer to the front side of the transparent film by:
      applying an opacifying layer to the front side of the transparent film, the opacifying layer containing opacifying agents selected from the group consisting of silicon dioxide, titanium dioxide, zinc oxide, calcium oxide, calcium carbonate, halospheres, plastic pigments, polymeric pigments, clays, aluminum oxide, and mixtures thereof; and
      applying an inkjet ink receiving layer to the opacifying layer.

7. The method as defined in claim 6 wherein the transparent film is a polyester film.

8. The method as defined in claim 6 wherein the reflecting layer is applied by any of sputtering, coating with finely grinded metal, mirror deposition from solution, electroless deposition, vacuum metallization, arc and flame spraying, electroplating, or metallic and alloy coating.

9. The method as defined in claim 8 wherein the reflecting layer comprises a material selected from the group consisting of aluminum (Al), copper (Cu), indium (In), silver (Ag), platinum (Pt), palladium (Pd), rhodium (Rh), indium tin oxide (ITO), and gold (Au).

10. A day-and-night backlit film system, including:
a transparent film having a front side and a back side, wherein the transparent film is a polyester film;
a translucent inkjet receiving coating layer applied to the front side of the transparent film, the translucent inkjet receiving coating layer comprising:
  an opacifying layer on the transparent film, the opacifying layer containing opacifying agents selected from the group consisting of silicon dioxide, titanium dioxide, zinc oxide, calcium oxide, calcium carbonate, halospheres, plastic pigments, polymeric pigments, clays, aluminum oxide, and mixtures thereof; and
  an inkjet ink receiving layer on the opacifying layer;
a reflecting layer applied to the back side of the transparent film, wherein the reflecting layer comprises a metal selected from the group consisting of aluminum (Al), copper (Cu), indium (In) silver (Ag), platinum (Pt), palladium (Pd), rhodium (Rh), indium tin oxide (ITO), gold (Au); and
a source of light to illuminate the reflecting layer from the backside of the backlit film, during night time.

11. The backlit film system as defined in claim 10 wherein the reflecting layer has a thickness within a range of about 5 Angstroms to about 3,000 Angstroms.

\* \* \* \* \*